United States Patent Office 3,254,565
Patented June 7, 1966

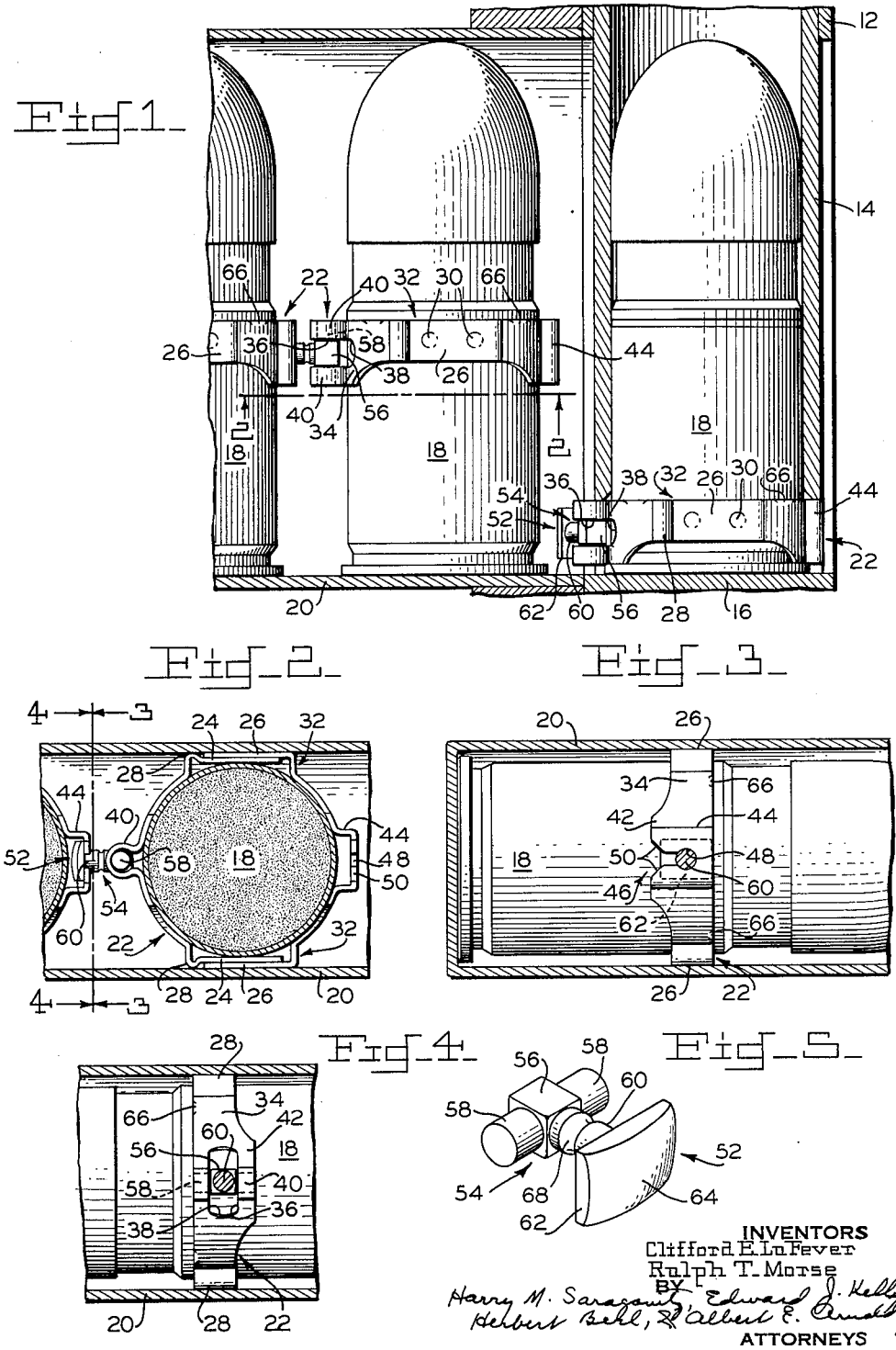

3,254,565
CONNECTOR MEANS FOR LONGITUDINALLY DISPLACEABLE CARTRIDGE BELT LINK
Clifford E. La Fever and Ralph T. Morse, Livonia, Mich., assignors, by mesne assignments, to the United States of America as represented by the Secretary of the Army
Filed Sept. 15, 1964, Ser. No. 396,786
4 Claims. (Cl. 89—35)

This invention relates to a disintegrating cartridge belt and is more specifically directed to a link and connector structure wherein disintegration of the belt requires that the link on one cartridge be moved rearwardly therealong relative to the link on the cartridge adjacent thereto.

In order to cope with the rapidly changing situations prevalent in modern warfare, the Army has recently developed a universal machine gun in which the rate of fire can be rapidly increased or decreased in a predetermined manner to provide maximum effectiveness thereof regardless of the nature of the particular target which may present itself to the operator of the gun. The required rapid change in the rate of fire is achieved by utilizing a variable output motor to furnish the motive power for the gun instead of depending on the forces normally available from the pressure of the expanding discharge gases. This motor rotates a drum formed with a suitable cam on the exterior surface thereof for actuating a barrel in a forward direction to expose the fired cartridge case for replacement by a live cartridge which will be chambered by the return of the barrel to battery position.

Since the gun is designed to be fed from the side, the ammunition therefor is connected into a continuous belt by means of a link encircling each cartridge and a connector releasably joining adjacent links. Thus, when the leading cartridge in the belt is advanced into position to be chambered by the barrel during the return movement thereof, the link thereon will be positioned in the path of the barrel and will be forced rearwardly thereby to disengage the connector thereon from the link on the next adjacent cartridge.

While an operative link and connector structure has been designed to provide the above-described function, as shown in patent application, Serial No. 124,290 filed July 5, 1961 and assigned to the U.S. Army by John G. Rocha, considerable difficulty has been experienced in assembling the connectors to the links to form the continuous belt. This assembly problem is primarily due to the multiplicity of parts required to provide a positive mechanical interference in the connector unit capable of preventing premature disintegration of the belt during the rough handling frequently encountered under combat conditions. This connector unit consists of four separate parts of which two are in the form of identical C-shaped keys which must be assembled to corresponding portions of adjacent links before such links can be united by a common connecting member having a slotted interior engageable with circular flanges on the opposite ends of each key. Since the open end of this slot in the connector is of lesser width than the cross-sectional thickness of the body of each key, a certain amount of force is required to install the latter into the reduced end of the slot whereupon the key is thus retained against premature disengagement from the connector. In view of the difficulty in accomplishing this forcible engagement between the connector and the keys, especially when attempted prior to the insertion of a cartridge into the link, it has been found necessary to employ a suitable tool for spreading the reduced end of the connector slot. This has required a stop member extending completely through the connector and bent at each end to limit the extent to which the connector member can be pried apart.

An attempt has been made to eliminate this complex connector structure through the substitution of a simple one-piece U-shaped member having one leg permanently secured to the link on one cartridge and the other leg in slidable engagement with the link on the adjacent cartridge. However, this structure did not prove satisfactory in use inasmuch as the plastic coating formed on the slidable arm of the connector to prevent premature disengagement from the link was not able to withstand either the rough handling frequently encountered by the ammunition prior to feeding attachment with the gun or the recoil forces imparted thereto during the actual feeding movement of the belt.

Accordingly, it is a general object of this invention to provide an improved connector structure for a cartridge belt wherein disentegration thereof requires the link on the leading cartridge to be forced rearwardly therealong during the chambering thereof by the barrel.

It is a further object of the present invention to provide a connector as aforesaid in the form of a unitary member adapted to be permanently retained in engagement with a link on one cartridge and releasably retained in positive engagement with the link on an adjacent cartridge.

Another object of this invention is to provide a connector as aforesaid which can be freely assembled into releasable engagement with a link without the use of tools and yet cannot be disengaged therefrom without the use of force.

Still another object of this invention is to provide a connector and link structure of the aforesaid type wherein the insertion of a cartridge in the link will position the connector so that subsequent disengagement therebetween must overcome positive mechanical interference.

It is a final object of this invention to provide a connector and link structure as aforesaid wherein the positive mechanical engagement therebetween will not interfere with the flexibility of the belt required during the fanning or helical twisting movements thereof.

Further objects and advantages of the invention will be apparent from the following specification and the accompanying drawings which are for the purpose of illustration only and wherein:

FIG. 1 is a lateral section taken through a gun barrel which is adapted to chamber the leading cartridge in a linked ammunition belt during the return of the barrel to battery position and shows the link on the leading cartridge at the conclusion of the rearward movement imparted thereto by the chambering movement of the barrel;

FIG. 2 is a sectional view taken along line 2—2 in FIG. 1 to show the manner in which the link is guided through the feed tray which extends laterally from the side of the gun;

FIG. 3 is a sectional view taken along line 3—3 in FIG. 2 to show the positive mechanical engagement between the connector and a cartridge belt link;

FIG. 4 is a sectional view taken along line 4—4 in FIG. 2 to show the engagement between the T-shaped cross bar at one end of the connector and the bifurcated loop projecting from the side of the link; and FIG. 5 is an enlarged perspective view of the unitary connector of the present invention.

It has been found that the problems encountered in feeding ammunition into an externally powered gun of the type wherein the return movement of the barrel to battery position is utilized to chamber each cartridge for firing can be satisfactorily overcome if the cartridges are carried in the form of a flexible belt in which adjacent links are joined by a one-piece connector in a manner which will positively resist separation until the link on the cartridge being chambered is forced rearwardly therealong by the barrel. In order to accomplish this positive connection of adjacent links, the one-piece connector is formed with a cylindrical body having an enlarged head at one end and a T-shaped cross-bar at the opposite end thereof. Each link is formed with diametrically opposed projecting portions suitably slotted and contoured to receive the respective ends of the connector. The projecting portion on the side of the link nearest the barrel during the feeding movement of the belt is designed to receive the enlarged head of the connector and to this end is provided with a slot which is open at the rear end thereof and extends forwardly into the projecting portion of the link to terminate in an enlarged end adapted to rotatably seat the cylindrical body of the connector in the fully assembled position thereof. Since the width of this slot is less than the diameter of the connector body, a groove is provided around the periphery thereof to align with the assembly slot and thereby permit the connector to be joined to the link without the use of tools or the necessity for force. However, when a cartridge is thereafter inserted into the link, the enlarged head of the connector will be laterally displaced thereby to position the peripheral groove therein out of alignment with the assembly slot so that premature disengagement of the connector from the link is prevented until sufficient longitudinal force is applied to the link adjacent thereto to cause the connector body to spread the sides of the slot as the link is forced to the rear of the cartridge.

As shown in FIG. 1 of the drawings, the gun to which the present invention is particularly applicable is provided with a receiver 12 in which a barrel 14 is slidably mounted to reciprocate forwardly from and rearwardly toward a battery position relative to a fixed breech 16. The reciprocation of barrel 14 is controlled by a motor-driven rotating drum (not shown) and is limited to a distance slightly in excess of the length of a cartridge 18. A rectangular feed tray 20 is suitably mounted at the side of receiver 12 in position to receive the end of a linked cartridge belt and guide the leading cartridge thereof into a firing position in coaxial alignment with the bore of barrel 14.

Each cartridge 18 in the belt is firmly but slidably encircled by a correspondingly shaped link 22 preferably formed by a pair of symmetrical halves each consisting of an arcuate portion terminating in linear and parallel ends 24 and 26. As best shown at 28 in FIG. 2, ends 24 are crimped at a point substantially adjacent the origin thereof to reduce the distance therebetween so that engagement thereof with the inner surfaces of corresponding ends 26 will provide an overlapping connection which can be suitably pinned or welded as indicated at 30. As a result, link 22 is formed as a resilient band provided with diametrically opposed rectangular sections 32 which are tangent to the periphery of cartridge 18 and cooperate with the interior wall surfaces of feed tray 20 to prevent tilting or other rotational movement of link 22 during passage therethrough into the gun.

As best shown at 34 in FIG. 4, the arcuate portion on one side of each link 22 is increased in width over the corresponding dimension of rectangular sections 32 and contains an elongated slot 36 terminating in arcuate ends 38. On each side of slot 36, link portion 34 is centrally provided with an outwardly projecting loop 40 of substantially U-shaped configuration. On the other side of link 22, diametrically opposite portion 34, is a similarly enlarged portion 42 formed with an outwardly projecting offset 44 of rectangular configuration containing a keyhole shaped slot 46 having an enlarged circular portion 48 at the front end thereof and a forwardly beveled portion 50 at the open rear end thereof.

In order to join cartridge 18 into belt form, an integral connector 52 is first assembled to each link 22. As best shown in FIG. 5, connector 52 is provided with a T-shaped crossbar 54 at one end thereof consisting of a central cubic section 56 and a cylindrical stud 58 extending from opposite sides of section 56 in coaxial alignment. The body of connector 52 is rod-shaped as indicated at 60 and extends integrally from cubic section 56 at substantially right angles to studs 58 to terminate in an enlarged rectangular head 62 formed with a spherical contour 64 on the outer surface thereof.

Since cubic section 56 is slightly smaller than the lateral distance between loops 40, connector 52 is assembled to link 22 simply by passing crossbar 54 through slot 36 in the side of link 22 from the exterior thereof until enlarged head 62 contacts the tops of loops 40. Further insertion of crossbar 54 through slot 36 is achieved by tilting enlarged head 62 in either direction and sliding connector body 60 in the same direction until halted by contact with the corresponding arcuate end 38 of slot 36. Connector 52 can then be rotated 90° to bring studs 58 thereon into parallel alignment with the open ends of loops 40. Thus, when rectangular head 62 is returned to the former upright position thereof, studs 58 will be positioned for entry into the open ends of loops 40 as connector 52 is pulled outwardly relative to the side of link 22. Inasmuch as the sides of each loop 44 are bent inwardly at the open end thereof to reduce the distance therebetween to slightly less than the diameter of studs 58 on connector 52, completion of the required assembly requires that the connector be pulled by head 62 to effect resilient spreading of loops 44. Although this means for retaining crossbar 54 in loops 40 permits each connector 52 to be preassembled to link 22, it is not essential inasmuch as the subsequent insertion of a cartridge into the link will prevent disengagement of connector 52 therefrom.

When crossbar 54 is fully assembled into loops 40, connector 52 is freely rotatable therein in either direction about an axis parallel to the longitudinal axis of link 22. In addition, since the diameter of studs 58 is less than the distance between the closed and open ends of each loop 44, connector 52 is permitted a limited degree of pivotal movement therein designed to promote desirable flexibility in the ability of the cartridge belt to spread or contract in the manner of a fan.

Once crossbar 54 on connector 52 is joined to link 22 in the above-described manner, such link can be fitted over the nose end of cartridge 18 and forced rearwardly to a substantially central position thereon as shown in FIG. 1. If a tighter gripping engagement between link 22 and the body of cartridge 18 should be required, suitable indentations 66 may be spaced about the interior periphery of link 22.

After link 22 has been properly positioned on cartridge 18, an empty link 22 can be assembled to the free end of the connector 52 projecting from the cartridge-containing link. This is accomplished by positioning the beveled open end 50 of slot 46 in rectangular offset 44 into engagement with the projecting body 60 of connector 52 and moving the empty link 22 rearwardly onto connector 52. Since the width of slot 46 between the enlarged front end 48 and the beveled rear end 50 thereof is slightly less than the diameter of connector body 60, force would ordinarily be required to spread the sides of slot 46 to the extent required for the passage of connector body 60 therethrough. However, the provision of a circumferential groove 68 in connector body 60 adjacent the junction thereof with cubic section 56 reduces the diameter thereof to the extent necessary to permit unobstructed rearward displacement of the empty link 22 relative to connector 52 until body 60 bottoms in the enlarged arcuate front end 48 of slot 46. Subsequent lateral movement of connector head 62 into the rectangular opening formed by offset 44 will bring groove 68 in connector body 60 out of alignment with the opposite inner edges of slot 46. Such lateral movement is automatically effected as cartridge 18 is inserted into the empty link 22 and the exterior periphery of the cartridge contacts the spherical outer surface 64 of head 62. When the parts are thus positioned, premature removal of connector 52 from slot 46 is prevented by the reduced width of keyhole slot 46. This bar to the unintended disassembly of a link 22 from connector 52 will be maintained as long as such link encircles a cartridge 18 since the exterior periphery of the latter will prevent lateral displacement of the enlarged rectangular head 62 of connector 52 relative to the rectangular opening formed by rectangular offset 44.

Thus, the foregoing link and connector structure provides means for connecting cartridges of relatively large diameter into a flexible belt capable of adequately resisting the unusually severe forces and accelerations frequently encountered in feeding such cartridges into a gun wherein the rate of fire thereof can be appreciably varied while the gun is in firing operation. These forces often reach a peak which requires an extremely strong connection between adjacent links. In the link and connector structure of the present invention, the required strength is obtained as a result of the relatively large bearing surfaces utilized in the mating engagement between the enlarged ends of connector 52 and the corresponding openings in the adjacent links 22. Furthermore, this strong connection is achieved without any significant loss in the ability of the cartridge belt to undergo the fanning and helical twisting movements necessitated by the abrupt changes in direction to which ammunition is often subjected during the feeding thereof from fairly remote fixed storage areas to the feedway of the gun as is generally encountered in many aircraft or vehicular installations.

Once cartridges 18 are assembled into this flexible belt, the connections therebetween are maintained until barrel 14 is in the act of chambering the leading cartridge subsequent to the advance thereof into firing position. During this chambering movement of barrel 14, the breech end thereof contacts the forward edge of link 22 encircling the cartridge 18 in the firing position and forces such link rearwardly along the cartridge thereby pulling connector 52 thereon past the restricted width of the keyhole slot 46 in the link on the adjacent cartridge to disconnect the leading cartridge therefrom. Thereupon, this rearward movement of link 22 is continued until the rear edge thereof comes into contact with the rim at the rear end of the leading cartridge 18. Thus, as barrel 14 is actuated forwardly upon the firing of the cartridge chambered therein to uncover the full length of the fired cartridge case, such case and the link thereon are both ejected from the side of the gun by the succeeding feeding advance of the cartridge belt.

Accordingly, the present invention provides a link and connector structure wherein one end of the latter may be readily assembled to the side of one link to position the opposite end of the connector for easy engagement with the corresponding side of an empty link. Once such engagement is completed, the insertion of a cartridge into the empty link positions the parts to provide positive resistance to separation until the link on the leading cartridge is actually forced rearwardly therealong. Thus, while assembly of the connector to adjacent links can be easily accomplished, the entire connection can be disassembled only with the exercise of a predetermined amount of force.

Although a particular embodiment of the invention has been described in detail herein, it is evident that many variations may be devised within the spirit and scope thereof and the following claims are intended to include such variations.

We claim:

1. In a disintegrating flexible belt for successively feeding a plurality of cartridges into an automatic gun having a reciprocating barrel adapted to chamber the leading cartridge in the belt during the return thereof to battery position, the combination of, a unitary link resiliently encircling each cartridge in slidable engagement therewith, said link having a bifurcated loop projecting outwardly therefrom and a similarly projecting rectangular offset diametrically opposite said bifurcated loop, a one-piece connector having an enlarged rectangular head at one end thereof receivable in said rectangular offset and a T-bar configuration at the other end thereof for rotatable engagement in said bifurcated loop, and means in said rectangular offset for retaining said connector in releasable engagement therewith at a point adjacent said rectangular head on said connector whereby the leading cartridge is connected to the next adjacent cartridge until the return of the barrel to battery position forces said link on the leading cartridge rearwardly therealong to withdraw said connector from said rectangular offset on said next adjacent link.

2. The combination defined in claim 1 wherein said means for retaining said connector in releasable engagement with said rectangular offset comprises a keyhole-shaped slot extending forwardly therein from the rear edge thereof, said slot having an enlarged portion at the forward end thereof for rotatably receiving said connector and a restricted portion rearwardly thereof for preventing disengagement of said connector therefrom except in response to the forces imparted to said link on the leading cartridge during the return of the barrel to battery position.

3. The combination defined in claim 1 wherein said T-bar configuration on said connector includes a central cubic section having a cylindrical stud extending from opposite sides thereof in coaxial alignment, and said bifurcated loop is formed with a restricted opening of lesser width than the diameter of said studs for preventing disengagement of said connector therefrom in the absence of a cartridge in said link.

4. In a disintegrating flexible belt for successively feeding cartridges into an automatic gun having a reciprocating barrel adapted to chamber the leading cartridge in the belt during the return thereof to battery position, the combination of, a resilient band encircling each cartridge in slidable engagement therewith, said band having diametrically opposed portions of increased width, one of said increased width portions having an elongated slot therethrough and an outwardly projecting loop on each side of said slot, a one-piece connector having a cylindrical body terminating in a T-shaped cross-bar at one end thereof adapted to rotatably seat in said loops, means on said loops for preventing disengagement of said connector therefrom in the absence of a cartridge in said resilient band, the other of said portions of increased width having a centrally disposed rectangular offset with a rearwardly opening keyhole-shaped slot therein, said connector having an enlarged rectangular head on the end opposite said T-shaped cross-bar, said connector body having a circumferential groove therein for permitting passage thereof into the forward end of said keyhole-shaped slot whereby said enlarged rectangular head is positioned for entry into said rectangular offset in response to the insertion of a cartridge into said resilient band, and a restricted section in said keyhole-shaped slot for preventing the exit of said connector body therefrom until said resilient band is forced rearwardly along the cartridge by the return of the barrel to battery position.

References Cited by the Examiner

UNITED STATES PATENTS 2,915,947   12/1959   Heeley _____ 89—35 X

BENJAMIN A. BORCHELT, *Primary Examiner.*

FRED C. MATTERN, JR., *Examiner.*